Feb. 28, 1956 — M. VOLPE — 2,736,271
BOLSTER FRICTION SNUBBER
Filed Aug. 14, 1952 — 4 Sheets-Sheet 1

Michael Volpe
INVENTOR

BY *[signature]*
ATTORNEYS.

Feb. 28, 1956　　　　M. VOLPE　　　　2,736,271
BOLSTER FRICTION SNUBBER
Filed Aug. 14, 1952　　　　　　　　　　　4 Sheets-Sheet 2
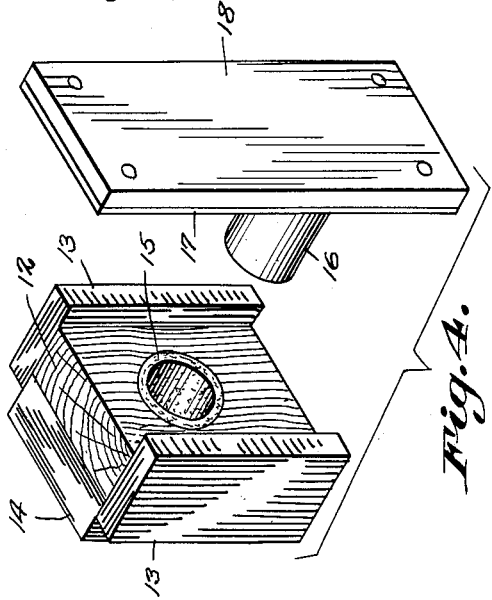
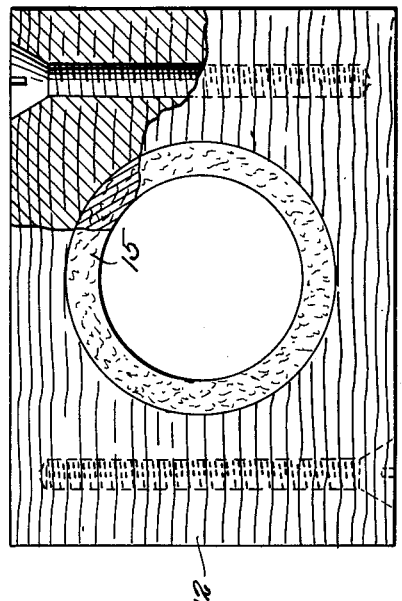
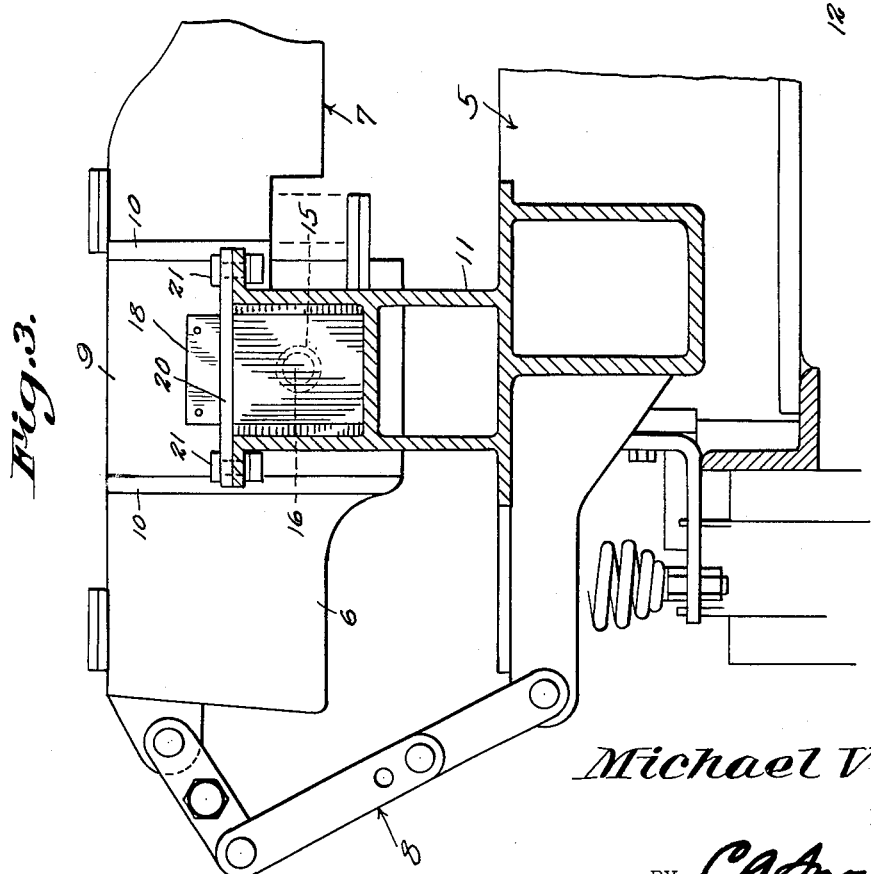
Michael Volpe
INVENTOR
BY C.A. Snow & Co.
ATTORNEYS.

Feb. 28, 1956  M. VOLPE  2,736,271
BOLSTER FRICTION SNUBBER
Filed Aug. 14, 1952  4 Sheets-Sheet 3
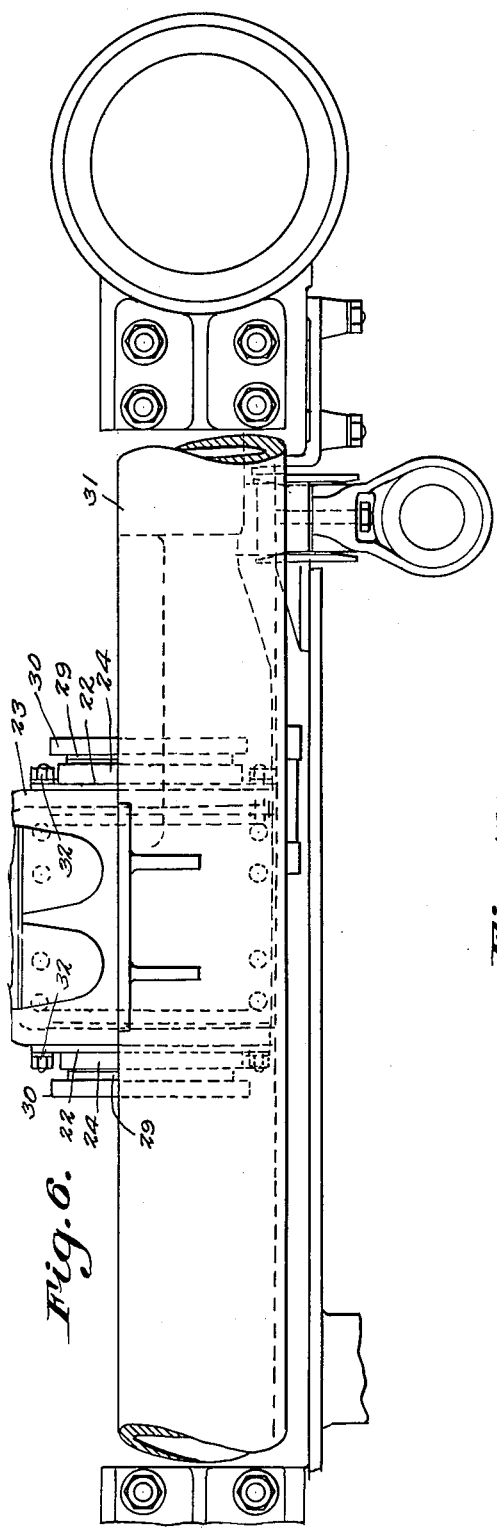
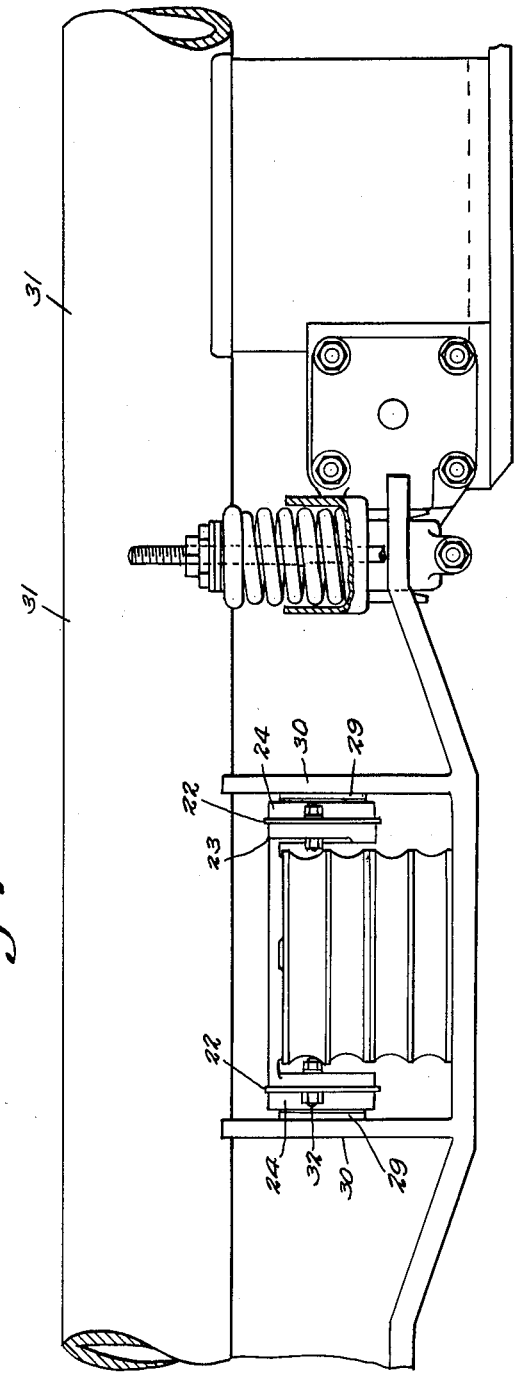
Michael Volpe
INVENTOR
BY *C. A. Snow & Co.*
ATTORNEYS.

Feb. 28, 1956 M. VOLPE 2,736,271
BOLSTER FRICTION SNUBBER
Filed Aug. 14, 1952 4 Sheets-Sheet 4
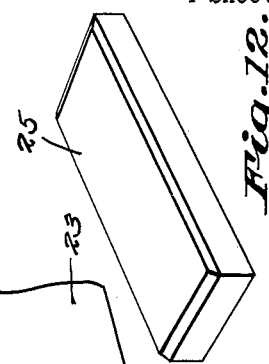
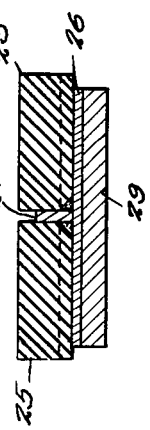
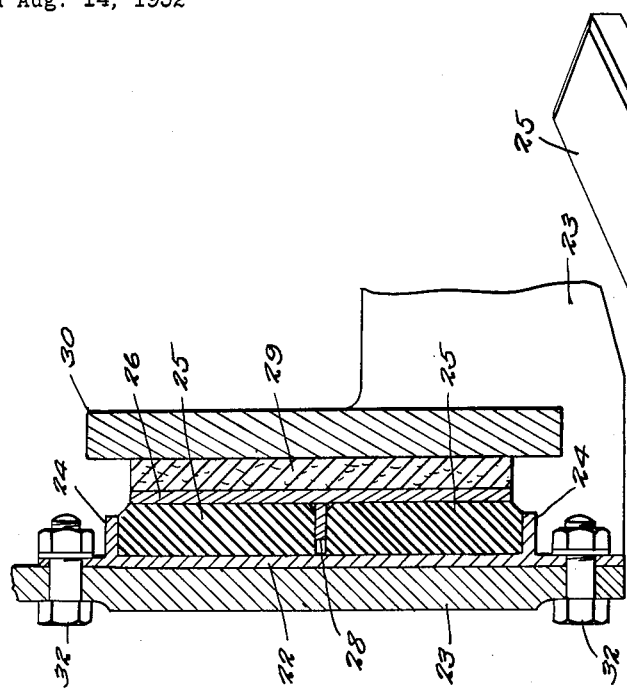
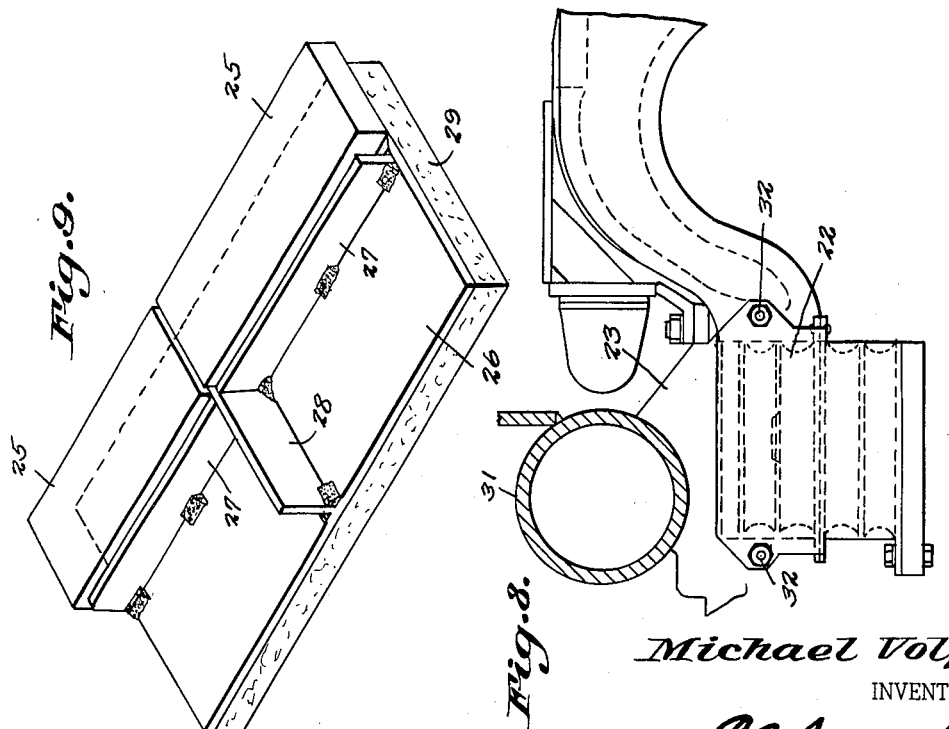
Michael Volpe
INVENTOR
BY C.A.Snow&Co.
ATTORNEYS.

United States Patent Office 2,736,271
Patented Feb. 28, 1956

2,736,271

BOLSTER FRICTION SNUBBER

Michael Volpe, Pittsburgh, Pa.

Application August 14, 1952, Serial No. 304,249

2 Claims. (Cl. 105—193)

This invention relates to railway truck bolster snubbers of the friction type, designed for the express purpose of snubbing vertical and lateral movements of truck bolsters on which the snubbers are used, to eliminate abrupt and sudden jarring of the car body mounted on the truck bolsters, to improve the riding qualities of the trucks equipped with the snubbers.

Another object of the invention is to provide means for snubbing the various movements of the truck bolsters to eliminate broken springs, noise from loose wedges or the like, to reduce damage to freight and at the same time provide a means for promoting smooth riding.

Another important object of the invention is to provide means for limiting compressing of rubber followers, forming a part of the snubbers, thereby preventing the followers from being overcompressed into distortion, impairing the efficiency of the rubber followers and snubbers.

A still further object of the invention is the provision of a snubber wherein the rubber elements thereof, which increase the snubbing action, may be readily replaced when the snubbers become worn and inoperative.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Fig. 3 is a fragmental elevational view of a truck frame member and bolster for the body frame as connected.

Fig. 4 is a perspective view illustrating the elements of the snubber, as disconnected.

Fig. 5 is a vertical sectional view through the main section of the snubber.

Fig. 6 is a plan view of the truck of a car.

Fig. 7 is a side elevational view of the truck and frame side tube, illustrating a modified form of snubber.

Fig. 8 is a fragmental and elevational view of one corner of a car truck showing the bolster to which the modified form of snubber is attached.

Fig. 9 is a perspective view of the modified form of snubber.

Fig. 10 is a vertical sectional view through the modified form of snubber illustrating the means for mounting the same.

Fig. 11 is a sectional view through the modified form of snubber taken at right angles to Fig. 10.

Fig. 12 is a perspective view of one of the rubber snubber blocks.

Figure 1:
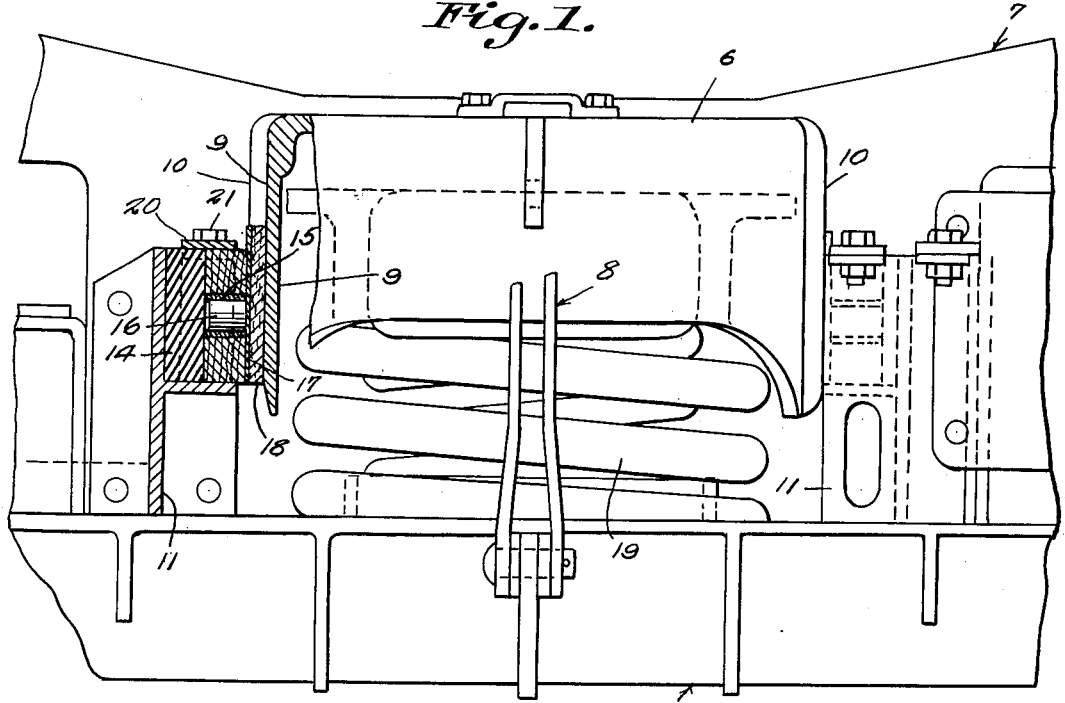
Figure 1 is a fragmental elevational view, showing a truck supplied with a snubber, constructed in accordance with the invention, portions of the truck and bolster being shown in section.
Figure 2:
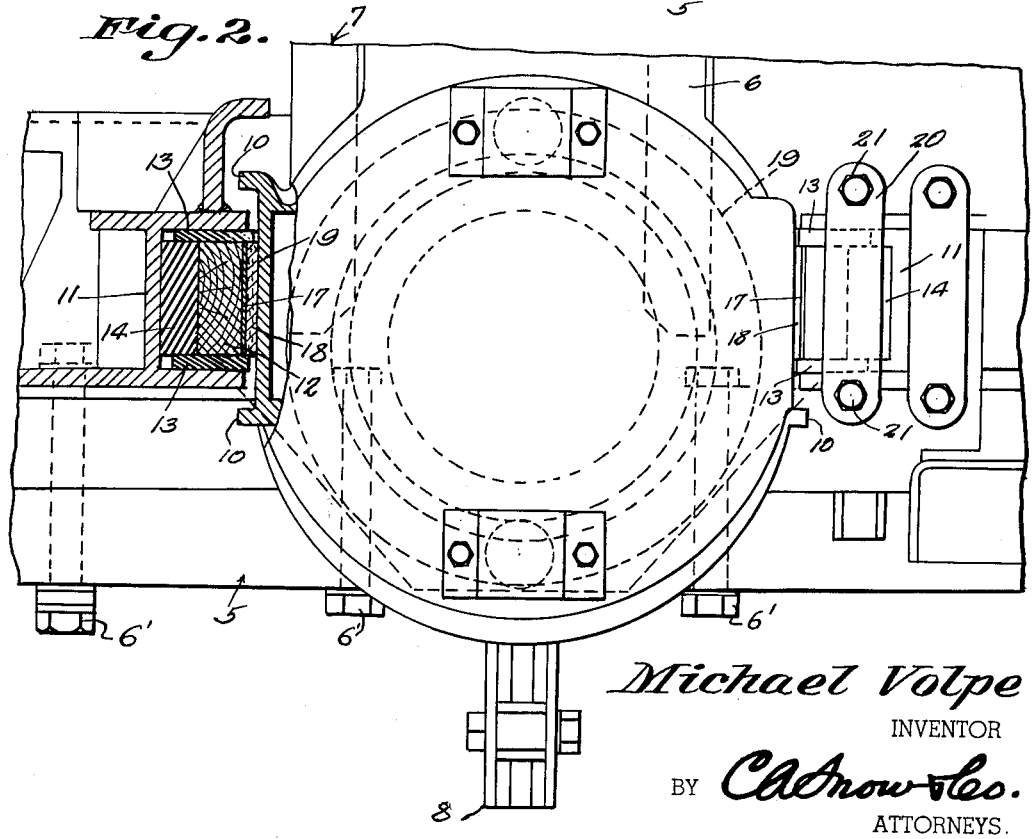
Fig. 2 is a fragmental plan view of a truck with the snubber attached, the snubber being shown in section.

Referring to the drawings in detail, the reference character 5 illustrates a cross beam or body bolster of a truck frame of the usual and well known construction, with which the bolster 6 of the body or frame of the truck 7 is associated, the bolster 6 being connected to the cross member 5 by means of the pivoted links 8. Bolts 6' connect the cross member 5 to the side frames of the truck.

The bolster 6 is provided with wear surfaces 9 that are formed with spaced longitudinal ribs 10, which ribs provide means for restricting lateral movement of the bolster with respect to the truck frame cross member 5. Rising from the truck frame cross member 5 is the support 11, to which the snubber, forming the subject matter of the present invention, is mounted, the snubber comprising the main or body portion 12, which is in the form of a wooden block, to the side edges of which are secured plates 13, which plates 13 are of widths to extend substantial distances beyond the front and rear surfaces of the main body portion 12, as clearly shown by Fig. 4 of the drawings.

The extended edges of the plates 13 adjacent to the inner faces thereof, provide a securing means for the prestressed rubber block 14. As shown by Fig. 4 of the drawings, the body portion 12 is formed with an opening disposed centrally thereof, which opening is lined with material such as the fabric lining material 15, which in use is coated or saturated with castor oil to cushion and prevent wear upon movement of the pin 16 which is mounted therein.

The pin 16 extends from the snubber plate 17 to which the snubber member 18 is secured, the snubber member 18 moving over the wear surfaces 9 of the bolster 6, with which it is associated, as the bolster moves with the body of the frame, as the result of the action of the truck springs 19. The snubbers are held in place by securing plates 20 which rest on the upper surfaces of the snubbers and have their ends secured to the supports 11 by means of bolts 21.

Due to this construction, it will be seen that lateral and vertical movements of bolsters on trucks equipped with these snubbers, wil be retarded or snubbed.

In the modified form of the invention, the snubber comprises the snubber box 22, which is bolted to the bolster 23 of the truck, the snubber box 22 being provided with outwardly extended flanges 24 in which the prestressed rubber blocks 25 of the snubber are held, when the snubber is positioned on a truck bolster for use. The prestressed rubber blocks 25 extend substantial distances beyond the edges of the plate 26 for contact with the flanges 24.

The snubber also includes the base plate 26 from one surface of which extend the ribs 27, which are disposed along the longitudinal axis of the base plate, with their adjacent inner ends spaced apart at a point exactly in the center of the base plate 26. The rib 28 is transversely disposed with respect to the base plate 26 and is located between the adjacent ends of the ribs 27, as shown by Fig. 9 of the drawings, the ribs 27 and 28 being welded to the base plate 26.

The prestressed rubber blocks 25 are of thicknesses to extend substantial distances beyond the free edges of the ribs 27 and 28, to the end that when the prestressed rubber blocks are positioned within the snubber box, the free edges of said ribs 27 and 28, will be held spaced from the snubber box 22, the ribs however, acting as stops to prevent the prestressed rubber blocks from being compressed beyond a point to render them ineffective.

Bonded to the base plate 26, is the snubber member 29 which is constructed of material such as used in the construction of the usual brake lining of vehicle brakes, the snubber member rubbing the plate 30 of the truck frame structure, with which the snubber is used.

The snubber shown in the modified form of the invention is designed primarily for use in a truck frame of tubular formation, a side tube of the truck frame being indicated by the reference character 31. Bolster 23 to which the snubber box is bolted by bolts 32, is suspended between these tubes.

From the foregoing it will be seen that movements of the bolster with respect to the truck frame, will be snubbed when moving vertically or laterally to reduce vibrations and jolts incident to the car truck moving over a railway track.

It will also be seen that due to the construction shown and described, the elements of the snubbers may be readily and easily replaced when they become worn and rendered inoperative.

Having thus described the invention, what is claimed is:

1. In a railway car truck, a truck frame embodying a cross member, vertical snubber supports embodying spaced side walls, rising from said cross member at the ends thereof, each snubber support having an open side, a bolster, means for connecting said bolster to said cross member for vertical sliding movement, said bolster operating above said cross member, said bolster having wear surfaces disposed opposite to the open sides of said vertical snubber supports, a snubber operating in each snubber support, each snubber comprising a wooden body portion having a horizontally disposed opening formed centrally thereof, vertical plates secured to the side edges of said wooden body portion, extending beyond the front and rear sides of said wooden body portion engaging the side walls of the snubber support, a prestressed rubber block secured to one surface of the wooden body portion resting against one surface of said snubber support, a snubber plate, a pin extending from said snubber plate disposed in said opening of the wooden body, connecting said snubber plate to said wooden body, and a snubber member secured to said plate movable over a wear surface of said bolster, restricting movements of the cross member and bolster with respect to each other.

2. In a railway car truck, a truck frame embodying a cross member, vertical snubber supports embodying spaced side walls, rising from said cross member at the ends thereof, each snubber support having an open side, a bolster, means for connecting said bolster to said cross member for vertical sliding movement, said bolster operating above said cross member, said bolster having wear surfaces disposed opposite to the open sides of said vertical snubber supports, a snubber operating in each snubber support, each snubber comprising a wooden body portion having a horizontally disposed opening formed centrally thereof, a fabric lining in said opening, vertical plates secured to the side edges of said wooden body portion, extending beyond the front and rear sides of said wooden body portion engaging the side walls of the snubber support, a prestressed rubber block secured to one surface of the wooden body portion resting against one surface of said snubber support, a snubber plate, a pin extending from said snubber plate disposed in said opening in contact with said fabric lining of the wooden body, connecting said snubber plate to said wooden body, and a snubber member secured to said plate movable over a wear surface of said bolster, restricting movements of the cross member and bolster with respect to each other.

References Cited in the file of this patent

UNITED STATES PATENTS

| | | |
|---|---|---|
| 2,046,391 | Latshaw | July 7, 1936 |
| 2,295,553 | Cottrell | Sept. 15, 1942 |
| 2,333,921 | Flesch | Nov. 9, 1943 |
| 2,378,229 | Light | June 12, 1945 |